J. M. YOUNT.
WELDED RAIL BOND AND FISH PLATE.
APPLICATION FILED NOV. 15, 1915.
1,170,132.  Patented Feb. 1, 1916.
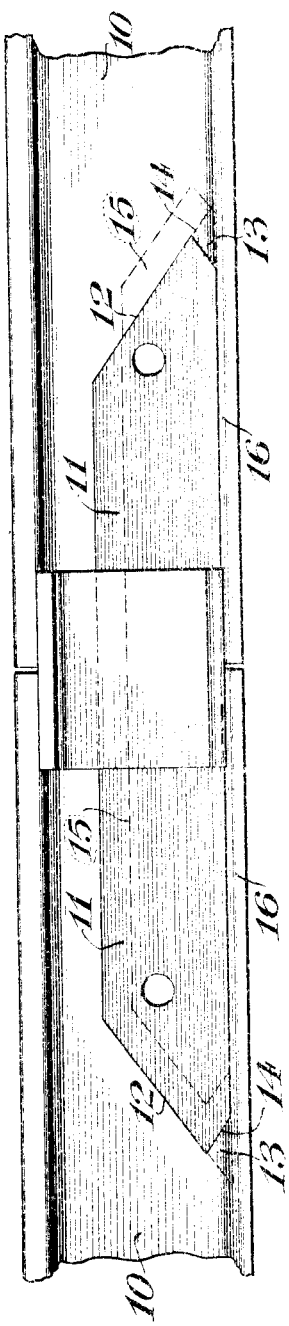
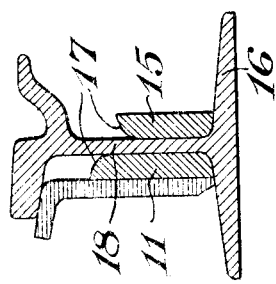
WITNESSES:
L. J. Forde.
B. M. Doolin.
INVENTOR
Jesse M. Yount.
BY
ATTORNEYS

UNITED STATES PATENT OFFICE.

JESSE M. YOUNT, OF SAN FRANCISCO, CALIFORNIA, ASSIGNOR OF ONE-HALF TO THOMAS FINIGAN, OF SAN FRANCISCO, CALIFORNIA.

WELDED RAIL-BOND AND FISH-PLATE.

1,170,132. Specification of Letters Patent. Patented Feb. 1, 1916.

Application filed November 15, 1915. Serial No. 61,488.

*To all whom it may concern:*

Be it known that I, JESSE M. YOUNT, a citizen of the United States, residing in the city and county of San Francisco and State of California, have invented new and useful Improvements in Welded Rail-Bonds and Fish-Plates, of which the following is a specification.

This invention relates to rail bonds of the type shown and described in my Patent No. 1,037,707, dated September 3, 1912, and has for its object to improve and simplify the operation and construction of the fish plates employed in the bond in such a way as to make possible their electric welding without danger of injuring or weakening the rail structure to which they are applied.

Where fish plates are applied to opposite sides of joined rails and electrically welded thereto the seams or joints will fall directly opposite each other in alinement and there is danger of weakening the rail structure from the concentration of heat. In my present invention I overcome this objection by providing opposed fish plates of varying heights so that their upper seams will not be in alinement, and overlap them longitudinally so that their end seams are staggered.

One form which my invention may assume is exemplified in the following description and illustrated in the accompanying drawings, in which—

Figure 1 shows a side elevation of joined rails embodying my invention. Fig. 2 shows a vertical, cross sectional view of the same.

Referring in detail to the drawings, joined rails 10 are shown. Applied to each, at one side, is a fish plate 11 of comparatively large height and having ends 12 oppositely beveled or slanted in a direction downward and away from each other. The beveled ends 12 are cut under at their lower ends 13 to eliminate the extremely acute angle at the point, leaving instead a downwardly and inwardly inclined surface 14. On the side of the rails opposite the fish plate 11 is a similar plate 15 of the same shape as the plate 11 but of a smaller height. Both of said plates rest upon the base flange 16 of the rails and are overlapped to throw their beveled ends out of alinement. When welded in this position the seams at the opposite sides of the rails will occur at different points and the heat will not be concentrated as in the case where the seams are in alinement. The inner corners 17 of the fish plates are preferably rounded to facilitate the application of the welding material, the fusion of which is carried on electrically to weld the plates to the rails throughout their perimeters.

It is of great importance in electric welding of rail joints to avoid the concentration of the intense heat applied to the seams, for it has been found in actual practice that welds or seams at opposite sides of the comparatively thin web portion 18 of the rails, when in alinement, will permanently weaken the rail structure. A similar injury will result to the rails where the seams at one side overlap for any appreciable length, and to eliminate this danger I have cut away the point 13 from the ends of each fish plate. By so undercutting the pointed ends of the plates the downwardly and inwardly projecting line 14 is not exposed for welding and hence joining of the base line and the beveled end line at the points 13 is avoided.

Having thus described my invention, what I claim and desire to secure by Letters Patent is—

1. A rail joint comprising abutting rail ends, and opposed fish plates therefor adapted to be welded to the rails at their perimeters, said opposed plates being arranged with their top and end seams out of alinement.

2. A rail joint comprising abutting rail ends, and opposed fish plates therefor adapted to be welded at their perimeters, one of said plates being of greater height than the other and the two being overlapped at their ends.

3. A rail joint comprising abutting rail ends and opposed fish plates therefor adapted to be welded thereto at their perimeters, said plates having acute angular ends with their apices cut away to prevent coincidence of the adjacent side and end seams.

4. A welded rail joint comprising abutting rails and opposed fish plates, the plate on one side arranged with respect to its companion so that the welding edges of the two plates are out of register.

In testimony whereof I have hereunto set my hand in the presence of two subscribing witnesses.

JESSE M. YOUNT.

Witnesses:
W. W. HEALEY,
M. E. EWING.